Dec. 4, 1951 O. C. KELLY 2,577,526
MIRROR MOUNTING AND PROTECTING DEVICE
Filed Jan. 27, 1949
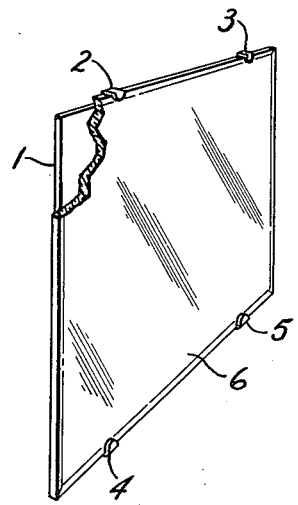
Fig. I
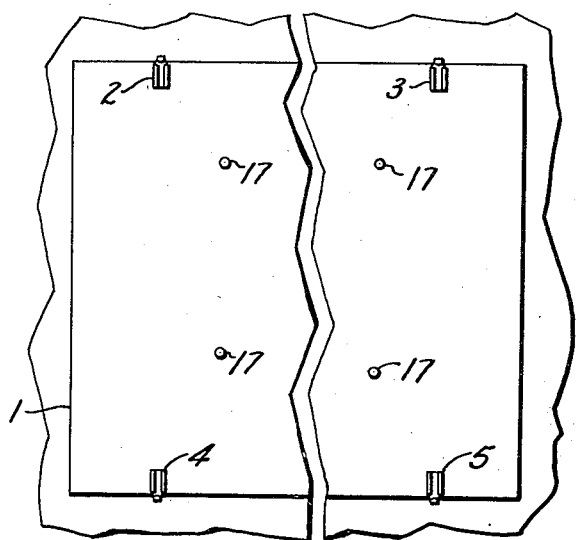
Fig. II
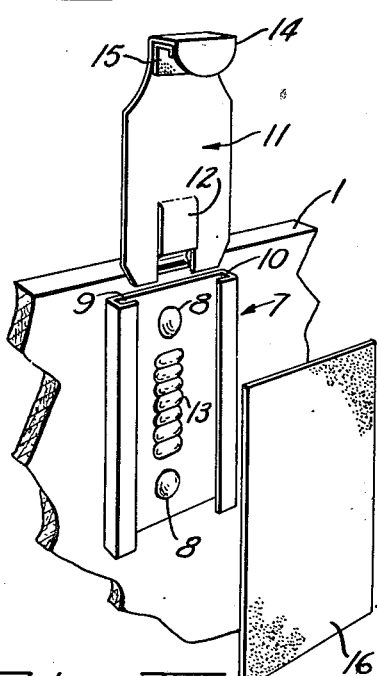
Fig. IV
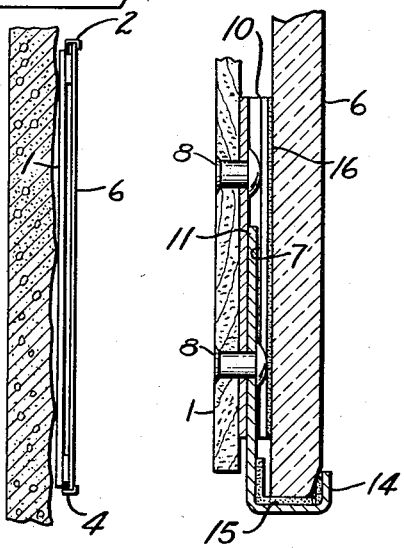
Fig. III  Fig. V
INVENTOR.
Ogilvie C. Kelly
BY
Marshall, Marshall & Leonard
ATTORNEYS Patented Dec. 4, 1951

2,577,526

UNITED STATES PATENT OFFICE 2,577,526

MIRROR MOUNTING AND PROTECTING DEVICE

Ogilvie C. Kelly, Toledo, Ohio, assignor to The Toledo Plate & Window Glass Company, Toledo, Ohio, a corporation of Ohio Application January 27, 1949, Serial No. 73,207

1 Claim. (Cl. 88—97)

The device of my invention has the plural functions of a mounting means for large unframed mirrors and a protector against rapid cooling and condensation and against moisture and chemical emanations from walls on which such mirrors are mounted.

It is an object of the invention to provide a device by means of which a large mirror can be mounted by a householder or other unskilled person upon a wall consisting of studding, lath and plaster, plasterboard and plaster, wallboard, or masonry.

It is a further object of the invention to provide a device by means of which large unframed mirrors can be mounted upon uneven walls without straightening, fairing, blocking or other preparation of the wall upon which the mirror is to be mounted.

It is a further object of the invention to provide a device by means of which a large unframed mirror can be mounted by an unskilled person upon a wall having an irregular surface so that the mirror will be reliably held in place without being subjected to strains which may damage it.

It is a further object of the invention to provide a device for mounting large unframed mirrors, which mounting device can be fastened to a wall by nails or screws that pierce the mounting device at random locations which may be determined by the positions of studding or other anchorages in the wall to which the device is fastened.

It is a further object of the invention to provide a device for mounting large unframed mirrors upon walls, which mounting device also functions as a shield to protect the mirror from the darkening effects of sulphurous emanations, the effects of emanations of fluorides and other halogen compounds, and functions as an absorbing shield against wall moisture and vapors.

It is a further object of the invention to provide a mounting device for large unframed mirrors which functions as an insulator interposed between the mirror and the cold wall to prevent rapid extraction of heat from the mirror and consequent liability of condensation which may cause transient fogging or permanent deterioration.

It is a further object of the invention to provide a mounting device for large unframed mirrors which so holds a mirror as to provide for ventilation over substantially the whole of the mirror back.

It is a further object of the invention to provide a mounting device for large unframed mirrors upon which a mirror can be placed and from which the mirror can be removed conveniently without tools and with little or no hazard of breakage and from which there is no danger of toppling the mirror while it is being cleaned and polished.

Still a further object is to provide a mirror mounting device with which a mirror can be packaged for handling and shipping and which serves, while part of the packaged combination, to protect the back of the mirror against damage by blows or atmospheric conditions.

These and other objects and advantages will be more clearly understood by reference to the drawings, in which:

Fig. I is a view in perspective showing a mirror with the mirror mounting device of my invention attached thereto for handling and packaging, a corner of the mirror being broken away.

Fig. II is a front elevational view, somewhat enlarged as compared with Fig. I, showing the mirror mounting device of my invention attached to a wall by means of large-headed nails, only a fragment of the wall being shown and the central part of the mirror mounting device and the wall fragment being broken out to reduce the size of the figure.

Fig. III is a side elevational view showing a mirror mounted on an irregular wall face by means of the mirror mounting device of my invention, only a fragment of the wall being shown in section.

Fig. IV is a view in perspective showing a disassembled clip and pad to be incorporated in the device of my invention, one of the clip parts being secured to a fragment of board.

Fig. V is a vertical sectional view of a lower corner fragment of a mirror and a mirror mounting device of my invention including a clip.

The mounting device of my invention consists of a plate 1 of fiberboard or other somewhat flexible and resilient, somewhat porous insulating material which is shaped to conform to the shape of the mirror to be mounted, and a plurality of clips 2, 3, 4 and 5 to fasten a mirror, such as 6, to the mirror mounting device.

In the embodiment of the invention illustrated in the drawings, the plate 1 of somewhat flexible and resilient, somewhat porous insulating material is rectangular. Preferably the dimensions of the plate are slightly less than that of the mirror to be mounted thereon, so that when the plate and mirror are in place on a wall, the plate will be concealed by the mirror. It is sufficient if the mirror extend one-half inch beyond the edges of the plate.

The clips 2 and 3, located at the upper side of the plate 1, are releasable and may take the form illustrated in Fig. IV. It will be noted that the clip illustrated in Fig. IV consists of a part 7 which is fixed to the plate 1 by means of rivets 8 and which has channels 9 and 10 to receive the sides of a removable clip part 11. The removable clip part 11 has a resilient tongue 12 the tip of which springs into successive engagement with a series of depressions 13 formed in the back of the clip part 7, and a hook 14 is formed at the upper end of the clip part 11, the hook being provided with a lining 15. A pad 16 is arranged to overlie the clip part 7 and to be cemented to the front flanges of the channels 9 and 10.

The lining 15 and the pad 16 should be made of felt or similar yielding material, and it is important that the material be free from sulphur or other chemical substance that might attack the silver or other reflecting metal of the mirror.

When the mirror to be mounted is rectangular in shape, two clips 2 and 3 usually are sufficient to hold the mirror's upper edge, even though the mirror be as much as six feet or more in width, and the clips preferably should be spaced some eight inches inwardly from the sides of the plate 1.

The clips 4 and 5, which are secured at the lower sides of the plate 1, may be one-piece clips or they may be of the same type as the clips 2 and 3, if when the clips 4 and 5 are secured to the plate 1 the clip parts 7 and 11 are riveted together as indicated in Fig. V. The hooks 14 of the lower clips 4 and 5 thus are stationary. The hooks 14 of the lower clips also have yielding linings 15, and yielding pads 16 are cemented over the fronts of the clips.

In mounting a mirror by means of the device of my invention, the plate 1 is laid against the wall in the position that is to be occupied by the mirror and fastened in place by nails or screws 17. The nails or screws may be driven through the plate 1 at various places and as many of them as desired may be used. Four nails driven to the depth of an inch or more into solid anchorages such as studding usually will be sufficient. If a nail upon being driven through the plate 1 fails to find a solid anchorage, other nails may be driven until sufficient solid anchorages are found.

It is well to avoid driving nails at locations closely adjacent to the clips. Wall surfaces seldom are exactly planar and if nails are not driven too close to the clips, the flexibility of the plate 1 will permit the plate to be bent to engage the clips with the mirror and the slight resilience of the plate will not exert sufficient force to create strains in the mirror that might damage it.

After the plate 1 has been secured to a wall, the movable parts 11 of the upper clips 2 and 3 may be pulled upwardly without being completely withdrawn from the channels 9 and 10 of the clip parts 7. The lower edge of a mirror 6 then may be seated in the hooks 14 of the lower clips 4 and 5 with the mirror tilted slightly forwardly, after which the upper edge of the mirror may be swung backwardly until the hooks 14 of the upper clips 2 and 3 can be pushed downwardly over the upper edge of the mirror. Since the hooks 14 have liners 15 of felt or other yieldable material and pads 16 of felt or other yieldable material are interposed between the back of the mirror and the fronts of the clips, the mirror is cradled in felt and is not liable to be abraded by contact with the metal of the clips.

The insulating properties of the fiberboard or other insulating material of which the plate 1 is composed prevent rapid heat transfer from the mirror to the wall if the wall becomes chilled or from the wall to the mirror if the wall is suddenly heated, and this characteristic of the plate, combined with the structure which induces ventilation by convection currents flowing between the mirror 6 and the plate 1, minimizes the possibility of moisture condensation on the mirror. The plate 1, being porous, absorbs any moisture that tends to accumulate at the points where the plate lies against the wall and by its wicking action dissipates such moisture as may be absorbed. The plate also acts as a shield to fend off sulphurous or halide or other emanations from wallpaper, plaster and wallboard, the deleterious effects of which sometimes are ruinous to expensive, large plate glass mirrors.

If, however, the mirror should be damaged by drippings from above, or otherwise, it can be removed readily by the householder or other unskilled person and as readily replaced after it is reconditioned.

Such simple directions and diagrams as may be helpful in instructing the householder as to the procedure to be followed in mounting the mirror can be prominently displayed by a printed sheet pasted upon or otherwise attached to the plate 1.

The invention thus provides a mounting device adapted to be packaged with a large mirror and to afford protection to the mirror during storage, handling and shipping; a mounting device which can be securely attached to almost any residential wall by an unskilled or even a clumsy person and which can readily be brought into conformity with a planar mirror even though the face of the wall to which it is fastened be rough or undulating; a mounting device to which a mirror may be applied with the utmost ease and which will hold the mirror reliably, though gently, until it is purposely removed, and which will protect it from sudden chilling, condensation and chemical discoloration and corrosion such as might otherwise occur because of the juxtaposition of the mirror and a wall.

Since it is unnecessary to prepare a wall by straightening, fairing or blocking, if it is ever desired to remove the mirror mounting device from the wall it is only necessary to withdraw the nails or screws and the mounting device can be taken down, leaving the walls substantially undamaged.

The embodiment of the invention herein shown and described is to be regarded as illustrative only, and it is to be understood that the invention is susceptible to variation, modification and change within the spirit and scope of the subjoined claim.

Having described the invention, I claim:

The combination with a sheet glass mirror of a slightly deformable plate of fiberboard material adapted to be fastened to a wall by randomly located wood screws or nails without being previously pierced, the back of said plate being unobstructed and smooth, whereby it is adapted to lie directly against the wall to which it is applied, said plate being slightly resilient and flexible for yielding application to non-planar wall surfaces and sufficiently porous to act as an insulator between a wall and the sheet glass mirror and to dissipate moisture by wicking and evaporative action, and hooked metal clips secured to the front of said plate and holding said sheet glass mirror and said plate spaced from each other and constituting the sole bridges therebetween to provide free ventilation and to prevent the capillary transfer of moisture from said plate to said mirror, those portions of the clips facing the back of the mirror being covered by yieldable pads, the hooks of certain of said clips projecting forwardly from the lower edge of said plate and opening upwardly, the hooks of others of said clips projecting forwardly from another edge portion of said plate and opening inwardly, said inwardly opening hooks being secured to said clips for in and out adjustment, the slight resiliency and flexibility of said plate adapting it to be sprung so that all of said hooks can be brought into engagement with the edges of said sheet glass mirror even though the plate be fastened to a wall with an irregular surface, whereby the lower edge of said mirror may be seated in the hooks projecting from the lower edge of said plate and the inwardly opening hooks then may be moved into engagement with other edge portions of said mirror.

OGILVIE C. KELLY.

REFERENCES CITED

The following references are of record in the file of this patent:

UNITED STATES PATENTS

| Number | Name | Date |
|---|---|---|
| 437,949 | Talcott | Oct. 7, 1890 |
| 2,129,189 | Adler | Sept. 6, 1938 |
| 2,142,321 | Moley | Jan. 3, 1939 |
| 2,184,893 | Lumley | Dec. 26, 1939 |
| 2,469,923 | Jones | May 10, 1949 |